US012621735B2

(12) United States Patent
Balan et al.

(10) Patent No.: US 12,621,735 B2
(45) Date of Patent: May 5, 2026

(54) MOBILITY OPTIMIZATION CONTROL

(71) Applicant: Nokia Technologies Oy, Espoo (FI)

(72) Inventors: Irina-Mihaela Balan, Munich (DE);
Sina Khatibi, Munich (DE); **Ahmad
Awada, Munich (DE); Ingo Viering**,
Munich (DE); Malgorzata Tomala,
Wroclaw (PL)

(73) Assignee: NOKIA TECHNOLOGIES OY,
Espoo (FI)

( * ) Notice: Subject to any disclaimer, the term of this
patent is extended or adjusted under 35
U.S.C. 154(b) by 312 days.

(21) Appl. No.: 18/551,680

(22) PCT Filed: Feb. 25, 2022

(86) PCT No.: PCT/EP2022/054781
§ 371 (c)(1),
(2) Date: Sep. 21, 2023

(87) PCT Pub. No.: WO2022/207204
PCT Pub. Date: Oct. 6, 2022

(65) Prior Publication Data
US 2024/0187945 A1     Jun. 6, 2024

(30) Foreign Application Priority Data
Mar. 30, 2021     (FI) ..................................... 20215373

(51) Int. Cl.
*H04W 36/08*          (2009.01)
*H04W 36/00*          (2009.01)
(52) U.S. Cl.
CPC ... *H04W 36/08* (2013.01); *H04W 36/008375*
(2023.05); *H04W 36/00838* (2023.05)

(58) Field of Classification Search
CPC ......... H04W 36/08; H04W 36/008375; H04W
36/00838; H04W 24/02; H04W 24/04
See application file for complete search history.

(56) References Cited

U.S. PATENT DOCUMENTS 10,085,184 B2 * 9/2018 Liu ....................... H04L 5/0048
2018/0167897 A1 * 6/2018 Sampath ............. H04W 52/367
(Continued)

FOREIGN PATENT DOCUMENTS

WO     2020/089791 A1     5/2020
WO     2021/052716 A1     3/2021

OTHER PUBLICATIONS

Nokia et al: "Corrections to inter-node signaling for MPE report-
ing", 3GPP Draft; R2-2009165, vol. RAN WG2, No. Electronic;
Oct. 23, 2020 (Year: 2020).*

(Continued)

*Primary Examiner* — Yuwen Pan
*Assistant Examiner* — Swati Jain
(74) *Attorney, Agent, or Firm* — Carter, DeLuca & Farrell
LLP

(57) ABSTRACT

According to an example aspect of the present invention,
there is provided a method, comprising: detecting a radio
frequency, RF, exposure limitation event, detecting a mobil-
ity related event, and transmitting, to a network node, a
report message for mobility optimization, the report mes-
sage being indicative of the mobility related event and
comprising RF exposure limitation information of the RF
exposure limitation event.

1 Claim, 5 Drawing Sheets

(56) References Cited

U.S. PATENT DOCUMENTS

| | | | | |
|---|---|---|---|---|
| 2020/0374818 A1* | 11/2020 | Cai | ..................... | H04W 52/42 |
| 2021/0022061 A1* | 1/2021 | Chou | ................... | H04W 36/22 |
| 2022/0007269 A1* | 1/2022 | Kaasalainen | ......... | H04L 1/1671 |
| 2022/0240151 A1* | 7/2022 | Yu | ..................... | H04B 7/18541 |
| 2023/0031232 A1* | 2/2023 | Kiilerich Pratas | .... | H04W 24/10 |
| 2024/0063859 A1* | 2/2024 | Grieco | ................ | H04B 7/0486 |
| 2024/0162969 A1* | 5/2024 | Kalbasi | ............... | H04B 7/0404 |

OTHER PUBLICATIONS

3GPP TS 38.300 V16.5.0 (Mar. 2021) 3rd Generation Partnership Project; Technical Specification Group Radio Access Network; NR; NR and NG-RAN Overall Description; Stage 2 (Release 16). [online], Mar. 29, 2021, (Year: 2021).*

ETSI TS 138 101-2 V16.4.0 (Jul. 2020), 5G; NR; User Equipment (UE) radio transmission and reception, Release 16 (Year: 2020).*

"Revised WID on enhancement of data collection for SON/MDT in NR and EN-DC", 3GPP TSG RAN meeting #88-e, RP-201281, Agenda: 9.10.14, CMCC, Jun. 26-Jul. 3, 2020, 5 pages.

"3rd Generation Partnership Project; Technical Specification Group Services and System Aspects; Telecommunication management; Performance Management (PM); Performance measurements Evolved Universal Terrestrial Radio Access Network (E-UTRAN) (Release 16)", 3GPP TS 32.425, V16.5.0, Dec. 2019, pp. 1-116.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16)", 3GPP TS 36.300, V16.3.0, Sep. 2020, pp. 1-390.

"Msc-generator", Sourceforge, Retrieved on Oct. 13, 2023, Webpage available at : https://sourceforge.net/projects/msc-generator/.

"Introduction of NR mobility enhancement", 3GPP TSG-RAN WG2 Meeting #109 electronic, R2-2001749, Intel Corporation, Feb. 24-Mar. 6, 2020, 525 pages.

"3rd Generation Partnership Project; Technical Specification Group Radio Access Network; NR; Requirements for support of radio resource management (Release 16)", 3GPP TS 38.133, V16.5.0, Sep. 2020, 1608 pages.

"3rd Generation Partnership Project; Technical Specification Group Radio Access Network; Universal Terrestrial Radio Access (UTRA), Evolved Universal Terrestrial Radio Access (E-UTRA) and Next Generation Radio Access; Radio measurement collection for Minimization of Drive Tests (MDT); Overall description; Stage 2 (Release 16)", 3GPP TS 37.320, V16.2.0, Sep. 2020, pp. 1-34.

"3rd Generation Partnership Project; Technical Specification Group Radio Access Network; NR; Radio Resource Control (RRC) protocol specification (Release 16)", 3GPP TS 38.331, V16.2.0, Sep. 2020, pp. 1-921.

"3rd Generation Partnership Project; Technical Specification Group Radio Access Network; NG-RAN; NG Application Protocol (NGAP) (Release 16)", 3GPP TS 38.413, V16.3.0, Sep. 2020, pp. 1-466.

Office action received for corresponding Finnish Patent Application No. 20215373, dated Sep. 17, 2021, 12 pages.

"3rd Generation Partnership Project; Technical Specification Group Radio Access Network; NR; NR and NG-RAN Overall Description; Stage 2 (Release 16)", 3GPP TS 38.300, V16.5.0, Mar. 2021, pp. 1-151.

"3rd Generation Partnership Project; Technical Specification Group Radio Access Network; NR; Medium Access Control (MAC) protocol specification (Release 16)", 3GPP TS 38.321, V16.4.0, Mar. 2021, pp. 1-157.

"3rd Generation Partnership Project; Technical Specification Group Services and System Aspects; Telecommunication management; Subscriber and equipment trace; Trace control and configuration management (Release 17)", 3GPP TS 32.422, V17.1.0, Dec. 2020, pp. 1-221.

Office action received for corresponding Finnish Patent Application No. 20215373, dated Jan. 13, 2022, 7 pages.

International Search Report and Written Opinion received for corresponding Patent Cooperation Treaty Application No. PCT/EP2022/054781, dated Jun. 20, 2022, 14 pages.

"Corrections to inter-node signalling for MPE reporting", 3GPP TSG-RAN WG2 Meeting #112 Electronic, R2-2009165, Nokia, Nov. 2-13, 2020, 23 pages.

Office action received for corresponding Indian Patent Application No. 202347071719, dated Feb. 17, 2025, 7 pages.

* cited by examiner

MOBILITY OPTIMIZATION CONTROL

RELATED APPLICATION

This application was originally filed as PCT Application No. PCT/EP2022/054781 on Feb. 25, 2022, which claims priority from Finnish Application No. 20215373, filed on Mar. 30, 2021, each of which is incorporated herein by reference in its entirety.

FIELD

Various example embodiments relate in general to wireless communication networks and more specifically, facilitating and controlling mobility optimization in such networks.

BACKGROUND

Upcoming mobile communication systems should fulfill a wide range of technical requirements to cope with the explosive growth of mobile data traffic, massive number of connected devices, emergence of new services and need for increased data transmission speed for mobile users.

Self-organizing networks (SONs) have been developed for mobile network management to reduce operational expenses, improve network coverage, capacity and service quality, detect and heal network faults. Mobile network self-optimization aims for optimized parameters and coverage usage, increased network quality and performance, and ensuring service quality for all mobile network users.

Mobility Robustness Optimization (MRO) is a mobility optimization technique aiming at reducing number of connection failures, comprising of Radio Link Failure (RLF) and handover failures (HOFs), in the network. MRO provides a solution for automatic detection and correction of errors in the mobility configuration. MRO adjusts the mobility parameters based on the statistics that are collected from the network and from UEs.

SUMMARY

Some aspects of the invention are defined by the features of the independent claims. Some specific embodiments are defined in the dependent claims.

According to a first aspect, there is provided a method, comprising: detecting a radio frequency, RF, exposure limitation event, detecting a mobility related event, and transmitting, to a network node, a report message for mobility optimization, the report message being indicative of the mobility related event and comprising RF exposure limitation information of the RF exposure limitation event According to a second aspect, there is provided a method, comprising: receiving a report message for mobility optimization, wherein the report message is indicative of a mobility related event experienced by a mobile device and comprises RF exposure limitation information, and controlling mobility optimization in the wireless network on the basis of the RF exposure limitation information in the received report message.

In an embodiment of the first aspect or an embodiment thereof, RF exposure limitation status is checked in response to the detecting the mobility related event. An RF exposure limitation status indicator may be included in the report message on the basis of the checking. The RF exposure limitation status indicator may indicate if the RF exposure limitation was active when detecting the mobility related event.

In an embodiment of the first aspect or an embodiment thereof, an RF exposure limitation event record is generated in response to the detected RF exposure limitation event. The RF exposure limitation information may be included in the report message based on information in the RF exposure limitation event record.

In an embodiment of the first aspect or an embodiment thereof, a timer is triggered in response to detecting the RF exposure limitation event and the RF exposure limitation information is included to the report message before expiry of the timer.

In an embodiment of the first aspect or an embodiment thereof, the RF exposure limitation information is included in the report message in one or more of: for each radio access channel attempt during random access to a target cell of handover, upon detecting the mobility event for a source cell while performing random access to a target cell in dual active protocol stack handover, upon detecting the mobility event for a source cell and/or a target cell during dual active protocol stack handover execution, and in response to detecting a beam failure.

In an embodiment of the second aspect or an embodiment thereof, the controlling mobility optimization comprises preventing mobility optimization based on the mobility related event in response to detecting an indication of an RF exposure limitation event for the mobile device in the report message.

In an embodiment of the first or second aspect or an embodiment thereof, at least some information in the report message is transmitted for mobility optimization in response to the report message indicating that RF exposure limitation event was not detected or active upon the mobile device experiencing the mobility related event.

In an embodiment of the first or second aspect or an embodiment thereof, at least some of the RF exposure limitation information is used or transmitted for controlling parameters affecting RF exposure limitation applied by the mobile device.

In an embodiment of the first or second aspect or an embodiment thereof, the mobility optimization comprises key performance indicator parameter collection based on the mobility related event, e.g. for 3GPP system based MRO.

In an embodiment of the first or second aspect or an embodiment thereof, the report message comprises a maximum permissible exposure status indicator and/or maximum permissible exposure status parameter information In an embodiment of the first or second aspect or an embodiment thereof, the report message is a radio resource control message or a medium access control message.

In an embodiment of the first or second aspect or an embodiment thereof, the report message is a radio link failure report, a handover report, a power headroom report, or a minimization of drive tests report.

There is also provided an apparatus comprising at least one processor, at least one memory including computer program code, the at least one memory and the computer program code being configured to, with the at least one processor, cause the apparatus at least to carry out features in accordance with the first and/or second aspect, or any embodiment thereof.

There is further provided an apparatus, comprising means configured for causing the apparatus at least to carry out features in accordance with the first and/or second aspect, or any embodiment thereof. The means may comprise at least one processor, and at least one memory including computer program code, the at least one memory and the computer program code being configured to, with the at least one processor, cause the performance of the apparatus. The apparatus caused to perform the first aspect may be a user equipment or comprised in a user equipment or device. The apparatus caused to perform the second aspect may be a radio access network node or comprised in a radio access network node, and may be configured for transmitting at least some of the RF exposure limitation information in the received report message for a mobility optimization control entity.

According to still further aspects, there is provided a computer program, a computer-readable medium, or a non-transitory computer-readable medium, which may comprise code configured for, when executed in a data processing apparatus, causing the apparatus to perform features in accordance with the first and/or second aspect, or an embodiment thereof.

EMBODIMENTS

Figure 1:
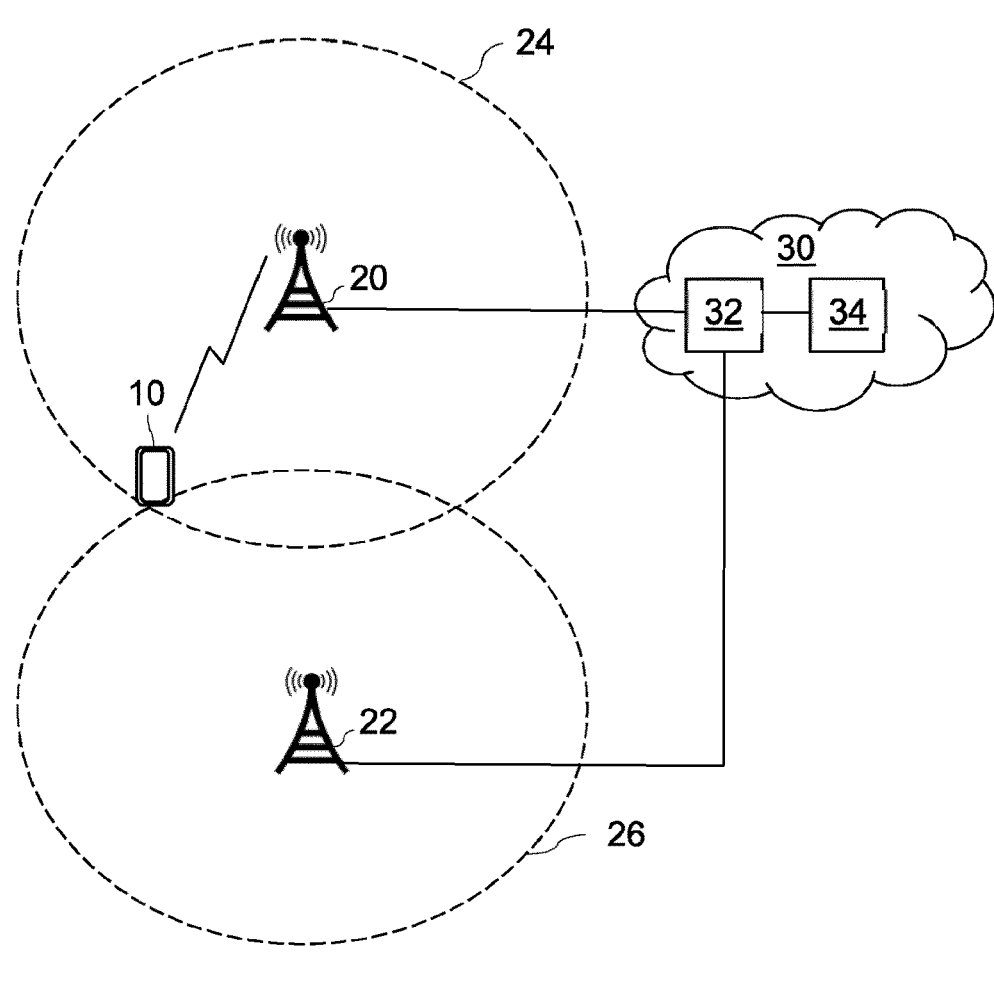
FIG. 1 illustrates an example wireless communication system.

FIG. 1 illustrates a simplified example system. A mobile communication device, herein referred to as user equipment (UE) 10 communicates wirelessly with a radio access network (RAN) device, which may also be referred to as wireless or RAN node, hereafter referred to as AN, 20, 22. Such RAN device or node AN 20 may be a NodeB, an evolved NodeB (eNB), a Next Generation (NG) NodeB (gNB), a base station, an access point, or other suitable wireless/radio access network device.

The UE 10 may be within a cell or coverage area or cell 24 of the AN 20 and attached to the AN 20 for wireless communications. The air interface between UE and AN may be configured in accordance with a Radio Access Technology, RAT, which both the UE 10 and AN 20 are configured to support.

Examples of cellular RATs include Long Term Evolution, LTE, New Radio, NR, which is also known as fifth generation, 5G, and MulteFire. On the other hand, examples of non-cellular RATs include Wireless Local Area Network, WLAN, and Worldwide Interoperability for Microwave Access, WiMAX. Principles of the present disclosure are not limited to a specific RAT though. For example, in the context of LTE, AN 20 may be a nodeB or evolved Node B (eNB), while in the context of NR, AN 20 may be a gNB.

The AN 20 may be connected, directly or via at least one intermediate node, with one or more devices or elements 32, 34 of a core network 30, such as a Next Generation core network, Evolved Packet Core (EPC), or other network management element. The core network 30 may comprise a set of network functions. A network function may refer to an operational and/or physical entity. For example, the element 32, 34 may be a network function or be configured to perform one or more network functions. The network function may be a specific network node or element, or a specific function or set of functions carried out by one or more entities, such as virtual network elements. Examples of such network functions include an access control or management function, mobility management or control function, session management or control function, interworking, data management or storage function, authentication function or a combination of one or more of these functions.

For example, a 3GPP 5G core network comprises Access and Mobility Management Function (AMF) which may be configured to terminate RAN control plane (N2) interface and perform registration management, connection management, reachability management, mobility management, access authentication, access authorization, Security Anchor Functionality (SEAF), Security Context Management (SCM), and support for interface for non-3GPP access. The element 32 and/or 34 may be configured to perform mobility optimization features, such as MRO features, on the basis of received report 25 messages (via/from the ANs 20, 22) indicative of mobile events experienced by UE 10.

The core network 30 may be, in turn, coupled with another network (not shown), via which connectivity to further networks may be obtained, for example via a worldwide interconnection network. The AN 20 may be connected with at least one other AN as well via an inter-base station interface, particularly for supporting mobility of the UE 10, e.g. by 3GPP X2 or similar NG interface.

The UE 10 may be referred to as a user device or wireless terminal in general. Hence, without limiting to Third Generation Partnership Project (3GPP) User Equipment, the term user equipment is to be understood broadly to cover various mobile/wireless terminal devices, mobile stations and user devices for user communication and/or machine to machine type communication. The UE 10 may be or be comprised by, for example, a smartphone, a cellular phone, a Machine-to-Machine, M2M, node, machine-type communications node, an Internet of Things, IoT, node, a car telemetry unit, a laptop computer, a tablet computer or, indeed, another kind of suitable user device or mobile station, i.e., a terminal.

Additionally, although the apparatuses have been depicted as single entities, different units, processors and/or memory units (not all shown in FIG. 1) may be implemented inside these apparatuses, to enable the functioning thereof. The system may also be able to support the usage of cloud services, for example some of core network operations may be carried out as a cloud service. The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. One of the concepts for 5G networks is network slicing in which multiple independent and dedicated virtual sub-networks (network instances) may be created within the same infrastructure to run services that have different requirements on latency, reliability, throughput and mobility.

The person skilled in the art will realize that the depicted system is only an example of a part of a system and in practice, the system may comprise further access nodes, the user device may have an access to a plurality of radio cells and the system may comprise also other apparatuses, such as physical layer relay nodes or other core network functions or elements, etc. A cellular radio system may be implemented as a multilayer network including several kinds of cells, such as macrocells, microcells and picocells, for example. Typically, in multilayer networks, one access node provides one kind of a cell or cells, and thus a plurality of NodeBs are required to provide such a network structure. 5G may also utilize satellite communication to enhance or complement the coverage of 5G service, for example by providing backhauling.

Wireless communication systems, and at least some of the devices 10, 20, 22 of FIG. 1, may comprise an antenna module or array with multiple antenna elements to combine signals into one or more beams for beam-based transmission and reception. The devices may thus be configured to utilize their spatial degrees of freedom for beamforming their transmitted signals and/or placing nulls towards coexisting devices. In general, beamforming uses multiple antennas to control the direction of a wave-front by appropriately weighting the magnitude and phase of individual antenna signals in an array of multiple antennas. In beam-based communication, a directional signal may be transmitted in desired spatial direction by a beam. Multiple beams may thus be available for transmitting signals to and from the UE 10.

National regulators, such as the Federal Communications Commission (FCC), limit maximum permissible exposure (MPE) of a human body for health reasons. Such restriction may limit (average) uplink transmit power of mobile phones into the direction of the body, depending on the distance. The MPE limit may aim at restricting the UE Tx power over a defined period of time for limiting RF exposure on human body. In order to keep these limits, the mobile devices have to detect bodies (or obstacles in general) and determine their distance. This is typically done with sensors (e.g. infrared or radar).

The MPE limits the equivalent isotropic radiated power (EIRP) of the mobile device towards the body. If the UE has multiple antenna panels with certain directivity, this may lead to significant restrictions for some of the panels (which point into the direction of a body), but no restriction to other panels. The MPE may be averaged over a predefined time period, e.g. 4 seconds. Practically, this means that MPE requirements may limit energy in a predefined interval, instead of explicitly limiting the transmit power of the UE.

Uplink transmit power control is specified to mitigate the near/far effect. The UE calculates its transmit power (e.g., on the physical uplink shared channel) with the equation:

$$P = \min \left\{ \begin{matrix} P_{CMAX}, \\ P_O + 10\log_{10}(M) + \alpha \cdot PL \end{matrix} \right\}$$

This simplified equation omits the closed loop component and drops some indices. Pcmax is the maximum transmit power allowed for the UE. PL is the pathloss measurement (typically measured via the downlink received power). M is the number of frequency chunks that are scheduled for the UE (which is signaled to the UE in the dynamic scheduling grants). P0 and alpha are configuration parameters which are signaled by serving base stations via radio resource control (RRC) signaling.

It can be observed that the transmit power significantly depends on P0 and alpha, as well as on M. In particular, whether or not the UE is operating close to power limitation (and whether or not it violates MPE) depends significantly on P0 and alpha of the serving cell, as well as on the scheduling in the serving cell.

The UE 10 may report an MPE event to the AN 20. A 3GPP UE may use power headroom reporting to provide a serving gNB to inform about the MPE event. When the MPE event is communicated to the gNB, the gNB can try to prevent a radio link failure. For example, most of uplink (UL) data traffic may be moved to FR1 during NR FR1-FR2 Carrier Aggregation or Dual Connectivity operations, and only necessary control signaling is maintained in FR2 UL to allow downlink (DL) connection and traffic to continue on FR2 carrier. Handover/reconfiguration may be performed from FR2 to FR1 or E-UTRA e.g. during FR2 standalone operations, or to another target cell in FR2 where the UE will not experience MPE limitations A further action that can be taken by the network is potentially changing the serving beam to another panel without MPE.

Mobility optimization functions, such as MRO in 3GPP networks, may adjust mobility parameters based on the statistics that are collected from the network and from UEs. Following types of failures can be distinguished as relevant for MRO:

Too-Late handover (TLH): An RLF occurs after the UE has stayed for a long time period in cell A and the UE attempts to re-establish the radio link connection in a different cell B.

Too-early handover (TEH): An RLF occurs shortly after a successful handover from a source cell A to a target cell B and the UE attempts to re-establish the radio link connection in the source cell A.

Handover to Wrong Cell (HWC): An RLF occurs shortly after a successful handover from a source cell to A to target cell B and the UE attempts to re-establish the radio link connection in a cell C other than the source cell A and the target cell B.

Very similar KPIs are being defined for NR for MRO in case of regular handover but also for new enhanced mobility mechanisms of Rel. 16 such as Conditional HO (CHO) and Dual Active Protocol Stack HO (DAPS HO).

Minimization of drive tests (MDT) is a feature introduced in 3GPP Release 10 that enables operators to utilize users' equipment to collect radio measurements and associated location information, in order to assess network performance while reducing the OPEX associated with traditional drive tests.

For example, entity 34 may be a network function or entity for mobility optimization, and may be referred to as mobility optimization element (MOE). The element may control, gather information for and/or perform mobility optimization. In an example embodiment, the entity 34 is an MRO or MDT entity, such as a trace collection entity (TCE). However, this is just one example of a mobility optimization entity which can be applied in connection with the present features.

A main concern with MPE requirements is the large maximum power reduction (P-MPR) needed, which in turn increases the risk for RLFs, UL outage and larger delays in completing radio access channel (RACH). Thus MPE enhancements are needed to mitigate these issues. Moreover, MPE events are sudden, unpredictable in nature and the UE behaviour in response to them is very much vendor specific.

MPE is especially problematic if triggered at the cell edge before or during handover (HO), when the connection to the network is most sensitive. Unless the network is aware of the applied P-MPR, radio link failure or connection releases due to significant and unpredictable UE P-MPR may occur. If MPE is triggered before a measurement report was sent in the source cell, e.g. in cell 24 to AN 20, it may happen there are multiple retransmissions needed or, in the worst case, it does not reach the source cell at all. This may lead to a handover being triggered later/too late and cause an RLF on the source cell. This will be mapped by MRO as a too late HO.

If MPE is triggered after the HO command was sent, when the UE 10 can no longer communicate with the source cell and needs to access a target cell, e.g. the AN 22 in the coverage area or cell 26, it may experience a delayed RACH, which may lead to a handover failure (HOF). This will later on be mapped by MRO to a too early HO or wrong cell HO. Note that the MPE event may 'survive' the handover (i.e. the P-MPR is also applied to the target cell) if the target cell is on the same panel as the source. Otherwise, even though the UE 10 is capable of providing MPE report, the report may be lost in the target cell.

An MRO mechanism analyses these KPIs and the relationship between them and then determines if handover needs to be triggered (sooner or later). It may then tune the triggering event parameters (e.g. time-to-trigger (TTT), cell individual offset (CIO)) to achieve the desired effect. E.g. if handover needs to be triggered sooner, due to a large number of too late handovers, the TTT or the CIO will be lower. However, since the failure happened because of MPE, no change from the network side on handover related event triggering conditions (on the parameters controlling the handover initiation/preparation or execution) will improve the situation and it could even make matters worse.

When the UE 10 is safe in the source cell (not near any cell boundaries) it can communicate the occurrence of MPE events, and the network can signal back a desired action to prevent RLF. However, in the case of mobility and HO, this communication is endangered due to the degradation of the source signal as the UE moves out of its coverage area. In other words, the report can be lost and the network may not be aware of MPE event, especially in mobility situations at cell edge.

There is now provided a solution facilitating to improve mobility optimization control, comprising triggering RF exposure reporting based on mobility related event experienced by a mobile device.

Figure 2:
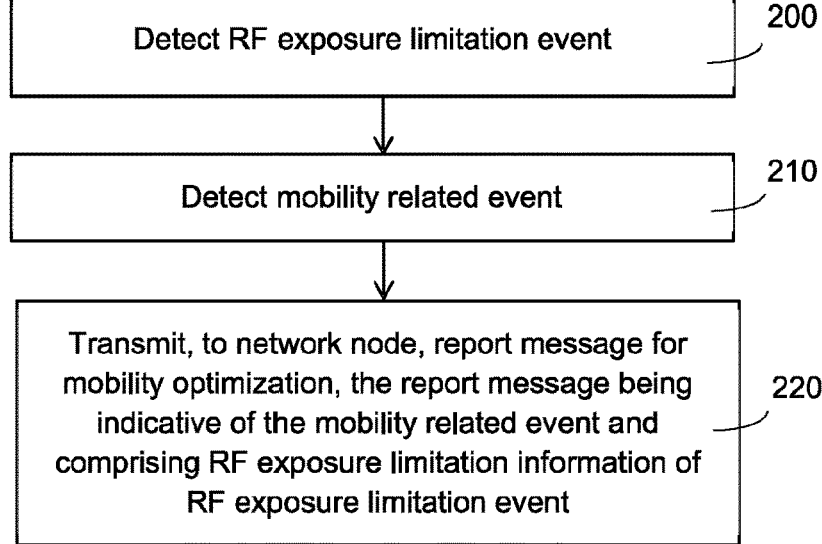
FIGS. 2 to 5 illustrate methods in accordance with at least some embodiments.

FIG. 2 illustrates a method for facilitating mobility optimization control. The method may be performed in or caused by a mobile communications apparatus or device, such as the UE 10, or a controller thereof.

The method comprises detecting 200 an RF exposure limitation event. Block 210 comprises detecting a mobility related event. Block 220 comprises transmitting, to a network node, a report message for mobility optimization, the report message being indicative of the mobility related event and comprising RF exposure limitation information of the detected RF exposure event.

Figure 3:
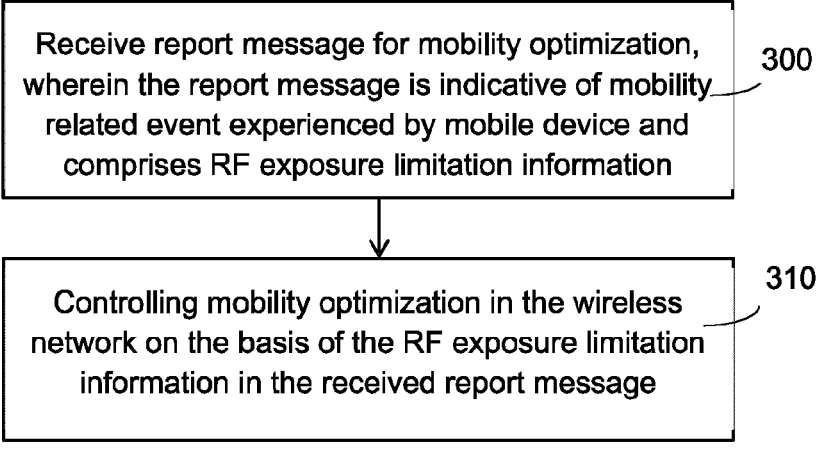

FIG. 3 illustrates a method for mobility optimization control. The method may be performed in or caused by a radio network node, entity, or device, such as the AN 20, 22 or a core network entity 32, 34, or a controller thereof.

Block 300 comprises receiving a report message for mobility optimization, wherein the report message is indicative of a mobility related event experienced by a mobile device and comprises RF exposure limitation information. The message received in block 300 may be message transmitted by the mobile device in block 220. Block 310 comprises controlling mobility optimization in the wireless network on the basis of the RF exposure limitation information in the received report message.

Mobility related event may generally refer to an event related to or caused by mobility of the mobile communication device. The mobility related event may be a connection failure or a connection reconfiguration/re-establishment event. The mobility related event may be a mobility related failure or a successful handover for the mobile device. Examples of such mobility related events comprise different types of handovers, radio link failure (which may occur due to mobility of the mobile device), or another type of event triggering and/or used as for mobility optimization in a mobile communications network. It is to be noted that the order of block 200 and 210 may be difference, i.e. the RF exposure may be detected after detecting a mobility related event, e.g. during a handover procedure.

Mobility optimization may refer to capability of a self-organizing mobile network to adapt mobility-related parameters based on collected performance indicators, such as MRO procedures in a 3GPP network referred to in many examples below. RF exposure limitation may refer to a transmission power limitation action at the mobile device to reduce the RF exposure for the user of the device, such as MPE in 3GPP embodiments and referred to in many examples below.

The RF exposure limitation information for the report message may be retrieved from a stored record, or actively generated based on an RF exposure limitation event. This may be a further block between blocks 210 and 220. The report message may generally refer to an already specified or new message suitable for indicating of a mobility related event experienced by the mobile device, such as a connection failure or connection reconfiguration/re-establishment message. The report message may be an RRC control message or a medium access control (MAC) layer message, such as RRC Reconfiguration Complete message, UE Information Response, or UE Assistance Information.

Controlling mobility optimization in block 310 may refer to directly performing, or causing (or affecting) a mobility optimization related operation, depending which network entity is performing the method. This may include controlling transmitting a message for a further network or node or entity performing mobility optimization. The mobility related event may be prevented from being transmitted to a mobilization optimization entity, such as a 3GPP network MRO entity, or otherwise prevented from being applied for mobility optimization by such entity.

Example embodiments of the methods can be related to 3GPP NR mobility optimization control related enhancements, some of which are further illustrated below. Though, it is noted that any references below to 3GPP/NR, as well as MPE used as example of RF exposure limitation and MRO used as example of mobility optimization, in this application are used as examples to describe some example embodiments, and other technologies can also be applied. The network device/AN 20 may thus be (or is configured to operate as) a gNodeB (gNB) comprising an NR-U transceiver. The mobile device/UE 10 may be a 3GPP User Equipment comprising an NR-U transceiver, for example.

RF exposure limitation information of the RF exposure event, such as an MPE event, may be generated and stored for subsequent use in response to the detected RF exposure limitation event 200. RF exposure limitation information may be defined in response to the mobility related event of block 210. Defining may refer to retrieving the RF exposure limitation information from a stored record, or actively generating the RF exposure limitation information based on the detected RF exposure limitation event.

Figure 4:
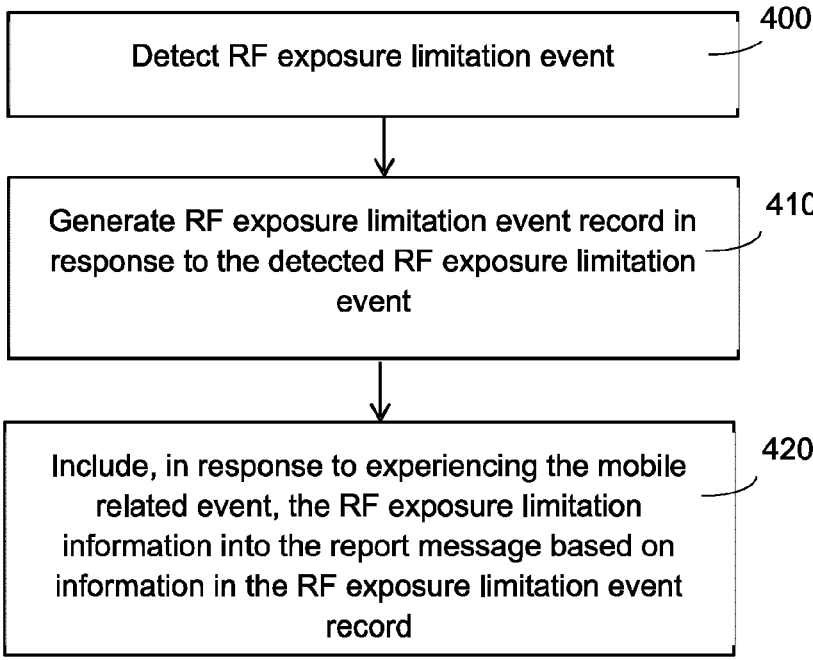

The mobile device, such as the UE 10 or a controller thereof, may be further configured to perform the method of FIG. 4, comprising:

Detecting 400 an RF exposure limitation event (as in block 200), generating 410 an RF exposure limitation event record in response to the detected RF exposure limitation event, and including 420, after detecting 210 or experiencing the mobile related event, the RF exposure limitation information into the report message, such as an RLF report successful handover report, or an MDT report, based on information in the (stored) RF exposure limitation event record.

The record may be stored in a memory of the device or after block 410 and retrieved from the memory in or before block 420.

The mobile device may check RF exposure limitation status in response to detecting 200 the mobility related event. This may be performed in block 210 or as an additional block after block 200.

An RF exposure limitation status indicator may be defined in block 210, or on the basis of block 210, and included in the report message transmitted in block 220. The status indicator may be defined on the basis of the RF exposure limitation status check. The RF exposure limitation status indicator may indicate if the RF exposure limitation was active when detecting the mobility related event.

For example, an MPE status indicator may be included in 3GPP report messages. A new flag, indicating if MPE was active or not, may be specified in the report message. Such indicator may be an optional information element, and named e.g. as mpe_active.

A timer may be triggered in response to detecting 200, 400 the RF exposure limitation event. The RF exposure limitation information may be included to the report message before expiry of the timer. Such timer may be referred to as RF exposure reporting timer, for example. If the timer has already expired when entering block 210, the RF exposure limitation information is not reported to the network. The RF exposure limitation event record may be removed from the memory upon expiry of the timer.

The RF exposure limitation event may be detected 200, 400, and the RF exposure limitation defined when the mobile device is served by a source cell, e.g. the UE 10 is in cell 24. The UE 10 may transmit 220, 420 the report message to a network node associated with a target cell after handover to the target cell, e.g. to AN 22 after handover to the cell 26.

For example, the UE 10 may record and report MPE event with a mobility related event in at least some of the following cases:

The UE may include MPE event information in an RLF report MPE related information per each RACH attempt during the random access to the target cell of handover.

The UE may include MPE event information in an RLF report and/or successful HO report if the UE has detected an MPE event for a source cell while performing random access to a target cell in DAPS handover.

The UE may include MPE event information in an RLF report and/or successful HO report if the UE has detected MPE event for the source cell and/or target cell during DAPS handover execution.

The UE may record and report MPE event information upon detecting a beam failure.

It is to be noted that, if CHO recovery is configured, the UE 10 may still be able to successfully complete the handover despite the failure. However, also in this case, it is beneficial to record the MPE related information and include it in a successful handover report, such as RRC Reconfiguration Complete message.

The controlling mobility optimization in block 310 may comprise preventing mobility optimization based on the mobility related event in response to detecting an indication of an RF exposure limitation event for the mobile device in the report message.

At least some information in the received report message may be used or transmitted for mobility optimization in response to the report message indicating that RF exposure limitation event was not detected or active upon the mobile device experiencing the mobility related event.

The mobility optimization may comprise key performance indicator (KPI) parameter collection based on the mobility related event. For example, upon receiving 300, 500 the report message regarding a failure linked to an active MPE event, by the presence of the flag or further detailed MPE information element(s), a receiving network entity may in block 310, 520 discard this particular instance from mobility linked optimization KPI collection (since correction of mobility parameters will not improve such a situation). For example, upon detecting the associated MPE event indication, the network entity may thus omit transmitting information of the mobility event to an entity collecting KPIs for MRO, or such entity does not store information of the mobility event. This will ensure that event parameters are not changed in vain as this could cause further mobility problems.

Figure 5:
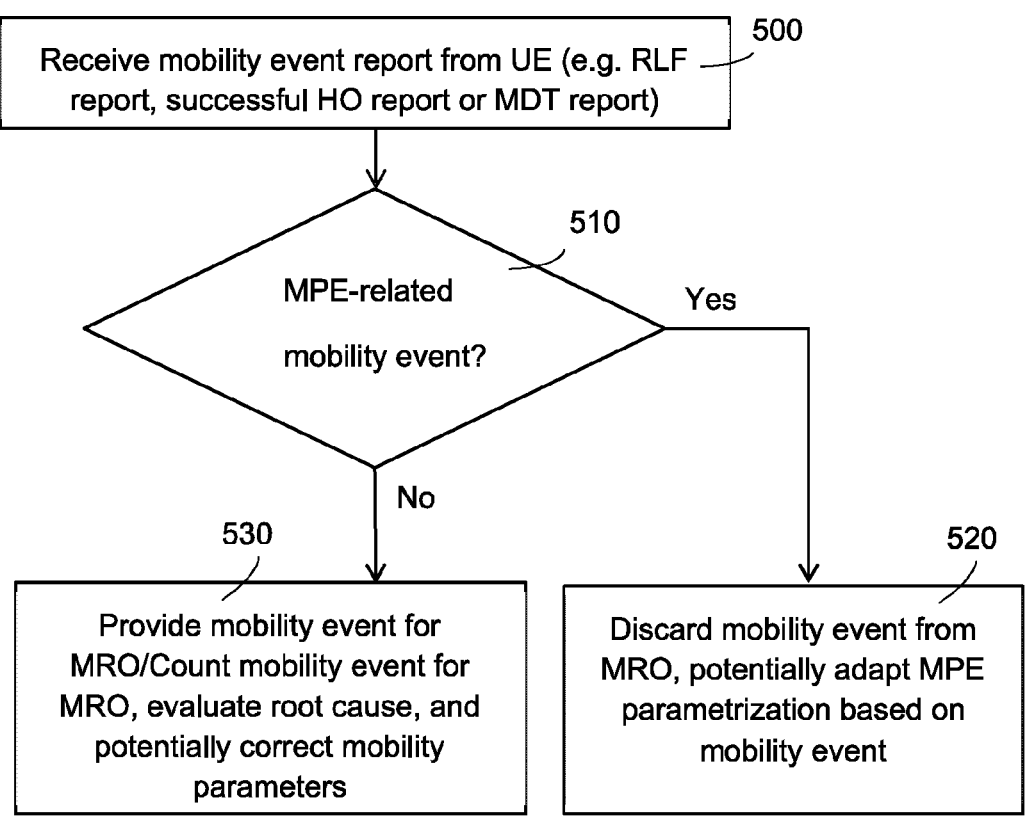

The network entity, such as the AN 20, 22 or the core network entity 32, 34, or a controller thereof, may be further configured to perform the method of FIG. 5, comprising:

Receiving 500 a mobility event report message (as the control message of block 300) from the UE 10, such as an RLF report, a power headroom report, a successful HO report, or an MDT report, checking if the mobility event indicated in the report is MPE-related (this may be performed by checking if the report comprises MPE information or flag), and in response to the mobility event being MPE-related, discarding 520 the mobility event from MRO, or in response to the mobility event not being MPE-related, providing 530 the mobility event for a further network entity for MRO or performing MRO operations, e.g. as specified for MRO in 3GPP systems. In some embodiments this comprises at least one of counting the mobility event for MRO, evaluating root cause for the mobility event, and potentially correcting mobility parameters.

At least some of the RF exposure limitation information may be used after block 310 for controlling parameters affecting RF exposure limitation applied by the mobile device. As also illustrated in block 520, MPE parameterization may be adapted based on the mobility event. This may be performed e.g. if a number predefined (for MPE reconfiguration triggering) of such reports are collected. The network entity receiving the report message, such as gNB, may thus decide to change some of the controlling MPE parameters and signal this to served UE(s) by appropriate RF exposure control signaling mechanism, such as by a RRCReconfiguration message, in order to avoid such issues in the future.

These features enable the network a chance to correct RF exposure limitation related parameter settings (e.g. 3GPP MPE related ones), while also allowing the network not to take ill-advised actions which will not improve mobility optimization outcome if the root cause for mobility failure event was an active RF exposure limitation event and not a misconfiguration in the mobility parameters.

Presently disclosed RF exposure limitation event reporting features and MPE event reporting may be applied for controlling MDT operations, based on the report message received 300, 500. The overall MDT data collection is handled via Trace Functionality. MDT measurements configuration is triggered from core network towards intended radio access network via Trace Activation Procedure.

Figure 6:
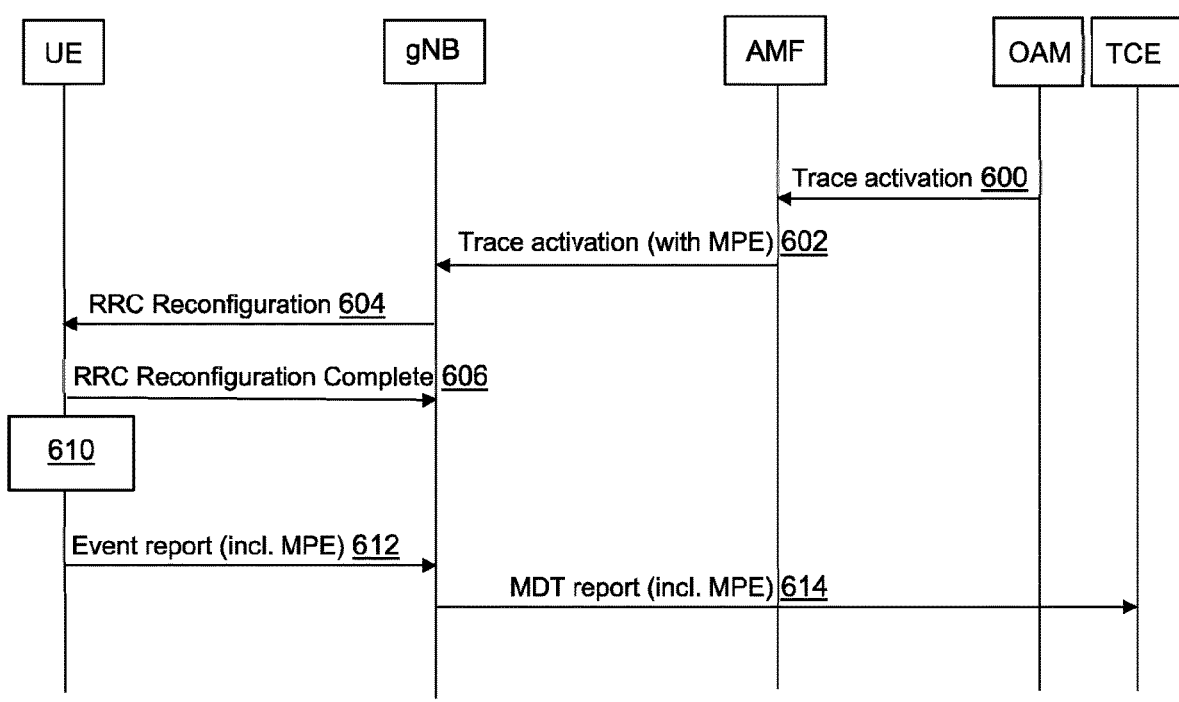
FIGS. 6 to 8 illustrate signalling examples.

As illustrated in the example of FIG. 6, the OAM and further AMF may now control gNB, by messages 600 and 602, for trace activation with MPE events. The gNB translates a received trace command to an RRC configuration to involve the UE into relevant radio measurements and events collection. The gNB performs RRC configuration procedure for MDT with the respective UE; messages 604 and 606. The gNB involved in MDT session by the trace activation procedure starts to monitor power headroom reporting with MPE event distinction. Upon detection of an MDT event in block 610, the UE sends back assistance information as event report 612 via RRC signalling. The report is processed by the gNB to generate a trace record, for further reporting onwards to Trace Collection Entity.

As illustrated in the example of FIG. 6, the UE may in block 610 perform MDT events check, radio resource management (RRM) events check, and/or MAC layer events check, now including MPE check. The event report 612 may thus be an MDT, RRC or MAC report including MPE event information. The gNB may transmit an MDP report 614 to the TCE on the basis of the received event report 612. For example, if a (real-time) power headroom (PH) report received from the UE by the serving gNB includes an MPE entry, such as an MPE P-MPR entry, the gNB may transmit or extend the PH report to the TCE with the MPE/MPR-related information.

An MPE entry in the report message, such as the event report 612 or the MDT report 614, may comprise a new flag indicating if MPE event was detected or not, and/or a new IE comprising detailed information on MPE parameters provided by the UE in the MPE report to the gNB. For example, the MPE parameters may comprise power backoff applied by the UE to meet the MPE FR2 requirements for a Serving Cell, i.e., power backoff for the maximum transmit power Pcmax.

The UE MPE PH report received in the gNB may thus be transmitted, forwarded or echoed back in trace records, and correlated with other MDT reports via trace functionality. Trace record reporting related message may be extended with an MPE (event report) entry to enable provision of the information to the TCE, to enable further processing and analysis.

Figure 7:
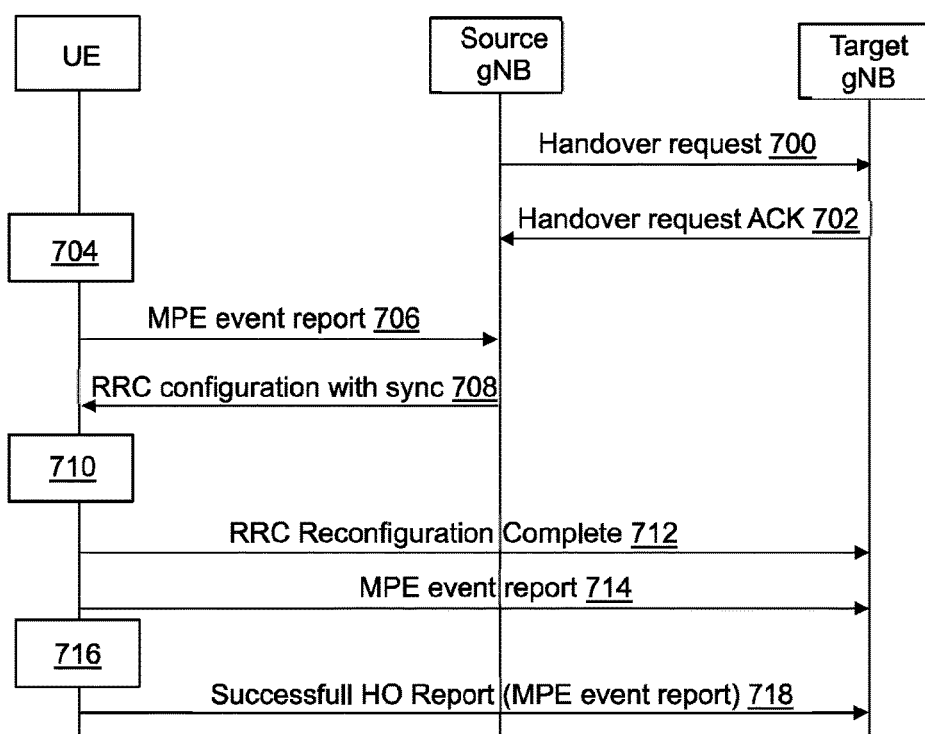

The report messages, such as MPE event reports, may be transmitted or repeated in a target cell. This may be performed for successful mobility events, such as successful HO, as in an example illustrated in FIG. 7 after a handover from a source gNB to a target gNB initiated based on messages 700 and 702. For this purpose, the UE that is capable of MPE reporting may monitor power headroom reporting with MPE event distinction around mobility event detection.

The UE may in block 704 trigger a timer, which may be a prohibit timer, for example, upon MPE detection and report the MPE event 706 to source gNB. Upon detecting a mobility event, in the present example based on the RRC configuration with sync message 708, the UE checks 710 the timer (for most recent MPE). Based on checking the timer, upon detection of an MPE event during a predefined (short enough) time period preceding reception of a HO command (which may be RRCConnectionReconfiguration with sync message), the UE may in block 710 maintain the report to make it available the target cell after the HO completion. After completing the RRC reconfiguration by message 712, the UE may transmit an MPE event report 714 to the target gNB.

The MPE event (report) transmission or repetition to target cell may depend on a triggered mode of MPE reporting:

In case only real-time MPE reporting is activated, the UE may instantly initiate the MPE event report transmission to the target cell (e.g. via UEAssistanceInformation message). This can be a report separate from MDT procedure/report or RRC event messaging.

If MPE logging is enabled based on check 716, the UE may in block 716 include transmit or repeat information on the MPE event to the target gNB. In case logged MPE reporting is allowed, the UE may include the MPE event report in SuccessfulHO Report 718.

As in preceding example embodiment, an MPE entry in the MPE report message may comprise a new flag indicating if MPE event was detected or not and/or new IE comprising detailed information on MPE parameters.

The transmission or repetition to target cell facilitates to avoid losing the MPE event report, and correlate the MPE event with mobility related events. Reception of the MPE report by the target cell provides additional way to report the MPE event through MDT framework (in case the target gNB is involved in data collection by Trace Functionality).

Another example embodiment, facilitating to avoid losing of the MPE report in case of RLF is illustrated with reference to example signaling of FIG. 8. The UE may in block 800 trigger a timer upon MPE detection and report the MPE event to the gNB by message 802. An RLF is detected based on received message 804 and the UE may in block 806 check if the timer (for the most recent MPE) has expired.

If the timer has not expired, the UE may in block 808 maintain the MPE event record for the target cell. Thus, in case of RLF that is followed by the RRC Re-establishment as recovery procedure (successful recovery from RLF), the UE having detected the MPE event within a predefined time period preceding the RRC Re-establishment procedure, may report the stored MPE event related information. The UE may signal the MPE event occurrence in the target cell of the reestablishment. The UE transmit an RRC reestablishment request with an MPE event record 810, indicative of at least the detected MPE event.

Additionally, the MPE event indication, record or report can be repeated. For example, after initiating the RRC reestablishment procedure, the UE may indicate the MPE event occurrence e.g. by:

A new flag, indicating at least if MPE event was detected, is included in the RRC Re-establishment Complete message 814 (in response to a received RRC Reestablishment message 812), or a new flag in RRC Re-establishment Complete message, indicating if MPE report is available for retrieval.

Figure 8:
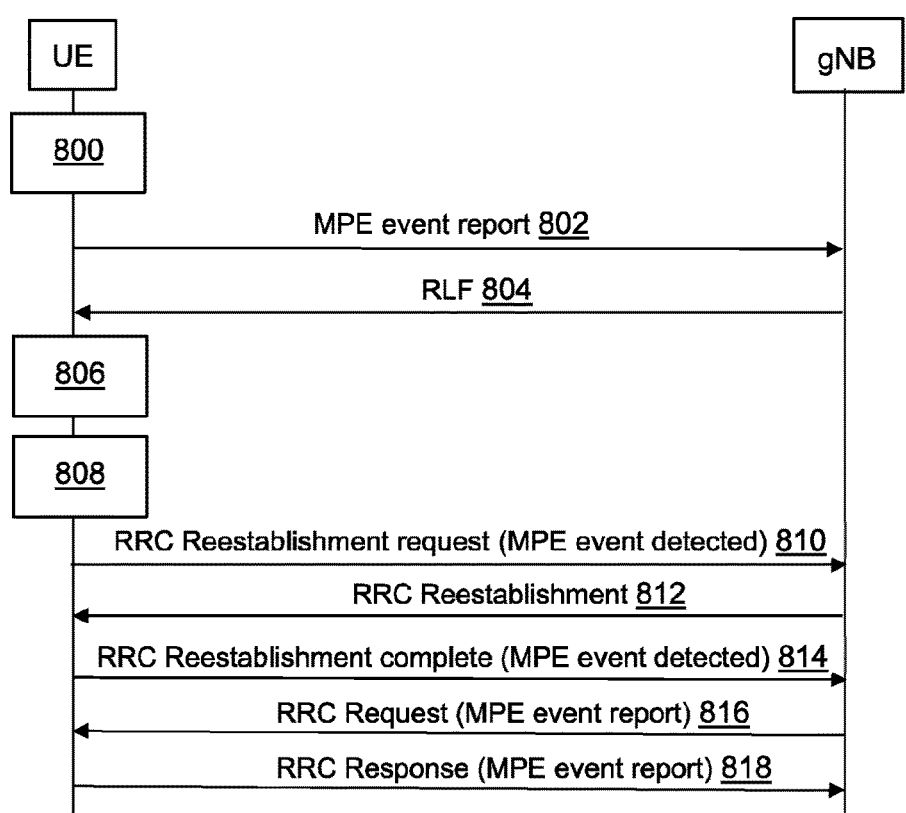

The latter case is further illustrated in FIG. 8. Upon receiving the indication of the available MPE report, the gNB may request the MPE event report by an RRC request 816, which may indicate or refer to the MPE report. The UE then transmits the MPE event report in an RRC response 818. The report may comprise detailed information on the associated MPE parameters, such as power backoff applied by the UE. Such separate procedural steps may be applied due to limited capacity of the RRC Re-establishment Complete message for MPE reporting.

As already indicated above, the report message of block 220, 300, 420, 500 may be an already specified mobility event related reporting message, into which one or more fields for the RF exposure information are included, such as the MPE event report/entry illustrated above. Already existing signaling mechanisms may be applied for transmitting the report message between the respective entities performing the present method.

For example, delivery of an RLF report and successful HO report including the MPE information and entry may be transmitted to the source cell, and/or a centralized node for further analysis, based on specified 3GPP signaling mechanisms for these messages. In an alternative embodiment, a new report message is specified, to include at least the RF exposure information and information on the associated mobility related event.

The UE 10 may record the time duration of the mobility optimization event e.g., how long the UE did apply P-MPR, and include such information in the report message 220, 420.

The report message and the RF exposure limitation information may comprise MPE status parameter information. A new IE containing detailed information on MPE parameters may thus be included in the report message. The MPE parameter information may include at least one of actual Tx power, P_MPR and power headroom information. An example of such mpe_info is illustrated by ASN. 1 code below):

```
mpe_info -r16 ::= SEQUENCE {
    mpe_trx_power        INTEGER (-30...33)  %dBm
    mpe_p_mpr            INTEGER (0...3)   OPTIONAL
    mpe_ph               INTEGER (0...63)  OPTIONAL
}
```

The value of mpe_p_mpr may have the same meaning as in PHR MAC CE, and defined as a value of x corresponds to a Measured P-MPR value P_MPR_x which can then be mapped to a measurement value range as below:

| Reported value | Measured quantity value | Unit |
|---|---|---|
| P-MPR_00 | $3 \leq$ PMP-R $< 6$ | dB |
| P-MPR_01 | $6 \leq$ PMP-R $< 9$ | dB |
| P-MPR_02 | $9 \leq$ PMP-R $< 12$ | dB |
| P-MPR_03 | PMP-R $\geq 12$ | dB |

The value of mpe_ph may have the same meaning as in PHR MAC CE, and defined as: a value of x corresponds to a POWER_HEADROOMx value which in turn corresponds to a value range as below:

| Reported value | Measured quantity value (dB) |
|---|---|
| POWER_HEADROOM_0 | PH $< -32$ |
| POWER_HEADROOM_1 | $-32 \leq$ PH $< -31$ |
| POWER_HEADROOM_2 | $-31 \leq$ PH $< -30$ |
| POWER_HEADROOM_3 | $-30 \leq$ PH $< -29$ |
| . . . | . . . |
| POWER_HEADROOM_53 | $20 \leq$ PH $< 21$ |

-continued

| Reported value | Measured quantity value (dB) |
|---|---|
| POWER_HEADROOM_54 | $21 \leq$ PH $< 22$ |
| POWER_HEADROOM_55 | $22 \leq$ PH $< 24$ |
| POWER_HEADROOM_56 | $24 \leq$ PH $< 26$ |
| POWER_HEADROOM_57 | $26 \leq$ PH $< 28$ |
| POWER_HEADROOM_58 | $28 \leq$ PH $< 30$ |
| POWER_HEADROOM_59 | $30 \leq$ PH $< 32$ |
| POWER_HEADROOM_60 | $32 \leq$ PH $< 34$ |
| POWER_HEADROOM_61 | $34 \leq$ PH $< 36$ |
| POWER_HEADROOM_62 | $36 \leq$ PH $< 38$ |
| POWER_HEADROOM_63 | PH $\geq 38$ |

It is to be noted that in the case of MPE, the reported power headroom will be negative. For example:

Example 1: Pcmax=23 dBm, required UE transmit power=22 dBm, actual transmit power is 22 dB, power headroom=1 dB Example 2: Assume now MPE event triggers and P-MPR of 9 dB is applied, new Pcmax=23−9=14 dBm, required UE TX power=22 dBm, actual TX power=14 dBm and PH=−8 dB.

While some embodiments have been described in the context of 3GPP 5G based systems, it should be thus appreciated that these or other embodiments of the invention may be applicable in connection with other technologies configured to operate on licensed or non-licensed band, such as 6G cellular systems, or other existing or future technologies facilitating RF exposure limitation and mobility optimization.

An electronic device comprising electronic circuitries may be an apparatus for realizing at least some embodiments of the present invention. The apparatus may be or may be comprised in a computer, a laptop, a tablet computer, a cellular phone, a machine to machine (M2M) device (e.g. an IoT sensor device or a vehicle communications unit for vehicle to anything (V2X) communications), a wearable device, a base station, access point device, a network function element or node, or any other apparatus provided with suitable communication and processing capability. In another embodiment, the apparatus carrying out the above-described functionalities is comprised in such a device, e.g. the apparatus may comprise a circuitry, such as a chip, a chipset, a microcontroller, or a combination of such circuitries in any one of the above-described devices.

Figure 9:
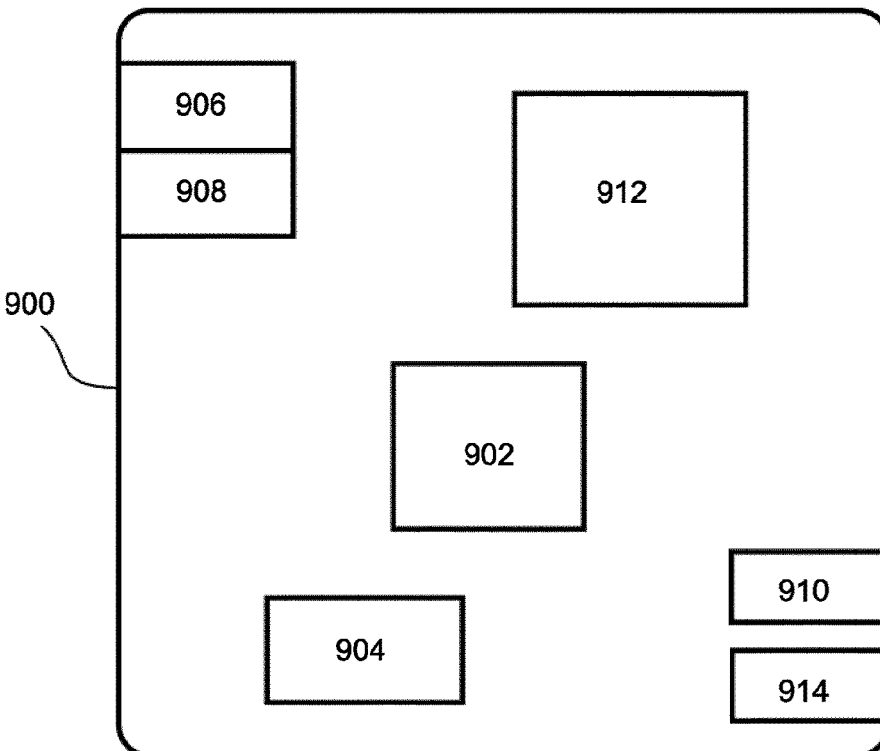
FIG. 9 illustrates an example apparatus capable of supporting at least some embodiments.

FIG. 9 illustrates an example apparatus capable of supporting at least some embodiments. Illustrated is a device 900, which may comprise a communications device arranged to operate as the UE 10 or the AN 20, for example. The device may include one or more controllers configured to carry out operations in accordance with at least some of the embodiments illustrated above, such as some or more of the features illustrated above in connection with FIGS. 2 to 8. The device may be configured to operate as the apparatus configured to perform the method of FIG. 2 or FIG. 3, or embodiments thereof, for example.

Comprised in the device 900 is a processor 902, which may comprise, for example, a single- or multi-core processor wherein a single-core processor comprises one processing core and a multi-core processor comprises more than one processing core. The processor 902 may comprise more than one processor. The processor may comprise at least one application-specific integrated circuit, ASIC. The processor may comprise at least one field-programmable gate array, FPGA. The processor may be means for performing method steps in the device. The processor may be configured, at least in part by computer instructions, to perform actions.

A processor may comprise circuitry, or be constituted as circuitry or circuitries, the circuitry or circuitries being configured to perform phases of methods in accordance with embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The device 900 may comprise memory 904. The memory may comprise random-access memory and/or permanent memory. The memory may comprise at least one RAM chip. The memory may comprise solid-state, magnetic, optical and/or holographic memory, for example. The memory may be at least in part accessible to the processor 902. The memory may be at least in part comprised in the processor 902. The memory 904 may be means for storing information. The memory may comprise computer instructions that the processor is configured to execute. When computer instructions configured to cause the processor to perform certain actions are stored in the memory, and the device in overall is configured to run under the direction of the processor using computer instructions from the memory, the processor and/or its at least one processing core may be considered to be configured to perform said certain actions. The memory may be at least in part comprised in the processor. The memory may be at least in part external to the device 900 but accessible to the device. For example, control parameters affecting controlling operations illustrated in connection with FIG. 2 or FIG. 3 may be stored in one or more portions of the memory and used to control operation of the apparatus. Further, the memory may comprise other control parameters, for example.

The device 900 may comprise a transmitter 906. The device may comprise a receiver 908. The transmitter and the receiver may be configured to transmit and receive, respectively, information in accordance with at least one wired or wireless, cellular or non-cellular standard. The transmitter may comprise more than one transmitter. The receiver may comprise more than one receiver. The transmitter and/or receiver may be configured to operate in accordance with global system for mobile communication, GSM, wideband code division multiple access, WCDMA, long term evolution, LTE, 5G or other cellular communications systems, WLAN, and/or Ethernet standards, for example. The device 900 may comprise a near-field communication, NFC, transceiver 910. The NFC transceiver may support at least one NFC technology, such as NFC, Bluetooth, Wibree or similar technologies.

The device 900 may comprise user interface, UI, 912. The UI may comprise at least one of a display, a keyboard, a touchscreen, a vibrator arranged to signal to a user by causing the device to vibrate, a speaker and a microphone. A user may be able to operate the device via the UI, for example to initiate or receive communication sessions via the transmitter 906 and the receiver 908, to operate applications performed in the device, to manage digital files stored in the memory 904 or on a cloud accessible via the transmitter 906 and the receiver 908, or via the NFC transceiver 910, and/or to control operation of the device.

Depending on the type or use of the device 900, it may comprise or be arranged to accept a user identity module or other type of memory module 914. The user identity module may comprise, for example, a subscriber identity module, SIM, and/or a personal identification IC card installable in the device 900.

The processor 902 may be furnished with a transmitter arranged to output information from the processor, via electrical leads internal to the device 900, to other devices comprised in the device. Such a transmitter may comprise a serial bus transmitter arranged to, for example, output information via at least one electrical lead to memory 904 for storage therein. Alternatively to a serial bus, the transmitter may comprise a parallel bus transmitter. Likewise the processor may comprise a receiver arranged to receive information in the processor, via electrical leads internal to the device 900, from other devices comprised in the device 900. Such a receiver may comprise a serial bus receiver arranged to, for example, receive information via at least one electrical lead from the receiver 908 for processing in the processor. Alternatively to a serial bus, the receiver may comprise a parallel bus receiver.

The device 900 may comprise further devices not illustrated in FIG. 9, such as further transmitter(s) and receiver(s) or UI elements. The processor 902, the memory 904, the transmitter 906, the receiver 908, the NFC transceiver 910, the UI 912 and/or the user identity module 914 may be interconnected by electrical leads internal to the device 900 in a multitude of different ways. For example, each of the aforementioned devices may be separately connected to a master bus internal to the device, to allow for the devices to exchange information. However, as the skilled person will appreciate, this is only one example and depending on the embodiment various ways of interconnecting at least two of the aforementioned devices may be selected without departing from the scope of the present invention.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or functional features may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof.

Furthermore, the described features, structures, or characteristics may be combined in any suitable manner in one or more embodiments. In the preceding description, numerous specific details are provided to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The verbs "to comprise" and "to include" are used in this document as open limitations that neither exclude nor require the existence of also un-recited features. The 10 features recited in depending claims are mutually freely combinable unless otherwise explicitly stated. Furthermore, it is to be understood that the use of "a" or "an", that is, a singular form, throughout this document does not exclude a plurality.

The invention claimed is:

1. A user equipment (UE) apparatus, comprising:

at least one processor; and at least one memory, said at least one memory stored with computer program code thereon, the at least one memory and the computer program code configured to, with the at least one processor, cause the UE apparatus at least to:

detect a radio frequency (RF) exposure limitation event;

generate an RF exposure limitation event record in response to the detected RF exposure limitation event;

detect a mobility related event, wherein the mobility related event is a beam failure event for the apparatus, the beam failure event comprising failure of a beam-formed radio transmission for the UE apparatus;

trigger a timer in response to detecting the RF exposure limitation event and include the RF exposure limitation information to a report message for mobility optimization before expiry of the timer;

check RF exposure limitation status in response to the detecting the mobility related event;

include an RF exposure limitation status indicator in the report message on the basis of the checking, wherein the RF exposure limitation status indicator indicates if the RF exposure limitation was active when detecting the mobility related event;

include, after detecting the mobility related event, the RF exposure limitation information in the report message based on information in the RF exposure limitation event record;

include the RF exposure limitation information in the report message in response to:

each radio access channel attempt during random access to a target cell of handover, detecting the mobility related event for a source cell while performing random access to a target cell in dual active protocol stack handover, and detecting the mobility related event for a source cell and a target cell during dual active protocol stack handover execution, or detecting a beam failure; and transmit, to a network node, the report message, the report message being indicative of the mobility related event and comprising RF exposure limitation information of the RF exposure limitation event, wherein the report message is configured to cause the network node to change one or more controlling MPE parameters, wherein the RF exposure limitation event comprises detection that a maximum permissible exposure (MPE) for a wireless device has been exceeded, and wherein the RF exposure limitation information comprises a time duration of the RF exposure limitation event and a magnitude value of exposure above a threshold, actual transmit power, an RF exposure limitation status indicator that indicated whether the RF exposure limitation was active when detecting the mobility related event, and a flag indicating whether MPE was active or not.

* * * * *